Feb. 2, 1926.
J. KASMEIER
INSECT DESTROYER
Filed Jan. 14, 1925
1,571,481
2 Sheets-Sheet 1
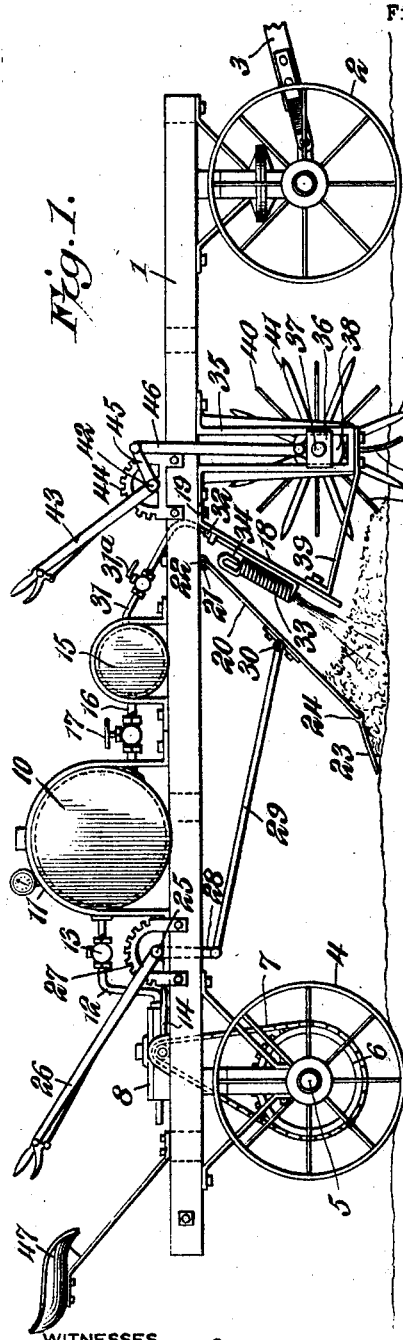
WITNESSES
F. P. Smith
Howard D. Orr
INVENTOR,
John Kasmeier,
BY E. G. Siggers.
ATTORNEY Feb. 2, 1926.
J. KASMEIER
INSECT DESTROYER
Filed Jan. 14, 1925
1,571,481
2 Sheets-Sheet 2
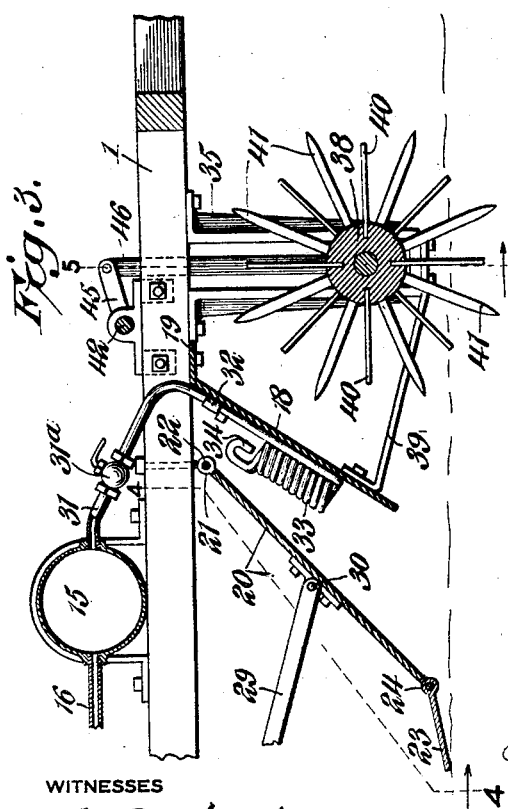
INVENTOR,
John Kasmeier,
WITNESSES
BY
ATTORNEY Patented Feb. 2, 1926.

1,571,481

UNITED STATES PATENT OFFICE.

JOHN KASMEIER, OF BEEVILLE, TEXAS.

INSECT DESTROYER.

Application filed January 14, 1925. Serial No. 2,327.

*To all whom it may concern:*

Be it known that I, JOHN KASMEIER, a citizen of the United States, residing at Beeville, in the county of Bee and State of Texas, have invented new and useful Improvements in Insect Destroyers, of which the following is a specification.

This invention relates to insect destroyers.

The object is to provide a machine which may be drawn over the ground, either by horse power or by motor power, after the ground has been plowed and cultivated and prior to the planting of the seed, said machine embodying means for "picking up" the relatively loose soil on the surface and "throwing" the same loosely through a zone subjected to the heat from a plurality of flames so as to penetrate the soil while in transit and destroy all forms of insect life which may be in the soil.

A further object is to provide a simple, cheaply manufactured, and strong and durable machine of this character which may be easily operated to destroy insects, such as boll weevils, cut-worms, or other pests, either by the use of heat, as above stated, when there are no growing plants or by the use of chemical spraying devices, when it is desired to destroy such pests after the plants have started to grow, said devices being readily interchangeable for the burners required for the heat process, the remainder of the machine being readily adaptable for either method of treatment of the soil or plants, without alteration.

A full and complete understanding of the invention may be obtained from a consideration of the following detailed description, taken in connection with the accompanying drawings forming a part of this specification, it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 1 is a side elevation of the insect destroyer.

Figure 2 is a plan view thereof.

Figure 3 is an enlarged detail sectional view taken through the active portion of the machine.

Figure 4 is a vertical, transverse section taken on the line 4—4 of Figure 3.

Figure 5 is a vertical, transverse section taken on the line 5—5 of Figure 3.

Figure 6 is a detail sectional view through one of the burners.

Figure 7 is a detail view showing a nozzle in lieu of the burner, when the machine is used for chemical spraying.

Any form of vehicle may be employed to support the mechanism essential in carrying out the invention, that illustrated in the drawings comprising a rectangular frame 1 formed, preferably of wooden beams having parallel side sills extending the full length of the frame and joined together by suitably spaced cross members, though the said frame may as well be formed of angle iron of proper size and strength.

At the front end, the frame is carried by suitable steering wheels 2 having suitable connections for a tongue 3 or shafts when it is desired to use draft animals. However, the frame 1 may consist of the chassis of a truck or automobile to be motor driven, or a suitable motor may be mounted on a specially designed frame and properly connected to drive the machine.

At the rear end, the frame is supported by a pair of wheels 4 preferably keyed to drive the rear axle 5, upon which, and adjacent to the center thereof, is mounted a sprocket wheel 6, which drives a chain 7 extending upwardly and passing about a smaller wheel constituting the driving means for a reciprocatory pump 8 of any desired form. The pump is mounted on a centrally disposed, longitudinal beam 9 extending from end to end of the frame and serving, in conjunction with the side sills, to strengthen the frame and to support the various parts to be later described.

A main fuel tank 10 of relatively large diameter is mounted transversely upon the longitudinal members of the frame in advance of the pump, and is suitably held in position by straps 11 or other fastening means, and said tank is connected to the pump by a centrally disposed pipe 12, having a check valve 13 therein, to prevent back pressure when the pump is in operation to place air pressure upon the contents of the fuel tank. Any well known form of clutch 14 may be employed to throw the pump out of action by the sprocket chain, when the tank has sufficient pressure, or when transporting the machine from one location to another and, of course, to throw the same into action when desired.

A distributor tank 15 is similarly mounted and held upon the frame 1 somewhat in advance of the main tank, and the two tanks are connected together by a centrally disposed pipe 16, having a cut-off valve 17, for the purpose of controlling the amount of fuel passing into the distributor tank, or for entirely cutting off the supply.

Beneath the frame 1 and in advance of the distributor tank, there is provided a depending, transversely disposed, front shield 18 formed of suitable sheet metal, and extending from side to side of the frame, to which the same is attached by means of an attaching flange 19 at its upper edge. The shield is inclined downwardly and rearwardly, as shown, and is rigidly held in position, the lower edge of the same being spaced from the ground level.

To the rear of the front shield 18 there is adjustably connected a second, or rear shield 20, having its upper edge formed into a hinge eye 21, for connection to a transversely disposed rod 22 connected to the lower faces of the side sills of the frame, which permits the rear shield to be swung forwardly or rearwardly to adjust the distance between the shields, and also to adjust the lower edge of the rear shield towards or away from the ground.

The lower edge of the rear shield 20 carries a trailing plate 23 hinged thereto, as at 24, to freely swing and to accommodate itself to the inequalities of the ground, said plate, together with the rear shield, where projecting below the front shield, serving to form an abutment against which the loose soil of the cultivated or otherwise pre-treated ground, is thrown in a manner to be described.

In order to effect the required adjustment of the rear shield in its forward and rearward movement, a transverse rock shaft 25 is mounted upon the upper faces of the longitudinal sills of the frame in suitable bearings provided for the purpose. The shaft 25 is provided at one end with an actuating handle or lever 26, having a suitable pawl and ratchet means for connection with an arcuate, toothed rack 27, which serve to hold the rock shaft in any position. The shaft is further provided with a pair of spaced, downwardly extending arms 28, to which are connected longitudinally disposed links 29, the forward ends of which are hingedly connected to the rear shield, as shown at 30, so that when the said pawl is released, the hand lever may be operated to rock the shaft and to impart the desired movement to said rear shield.

Communicating with the front side of the distributor tank 15 are a plurality of spaced feed pipes 31, of relatively small size, each pipe being bent to extend downwardly between the front and rear shields and terminating in a coupling 32, the terminal of said pipe being secured to the rear side of the front shield in any desired manner. Applied to each coupling 32 is a burner 33 formed of similar size pipe and bent into a coil, the free end of the pipe being located at the top of the coil and provided with a return bend located at the center of the coil and directed downwardly, as indicated at 34, to cause the fuel, under pressure, to pass through the coil and be pre-heated thereby for converting the same into gas, in a well known manner. Any other form of burner may, however, be substituted therefor, and each burner is under control independently of the others, by means of small valves 31ª included in the feed pipes 31.

Bearing brackets 35 are suitably secured to the under faces of the side sills of the frame 1, said brackets having spaced side members joined together at their lower ends to provide longitudinal guides or passageways for bearing blocks 36, suitably mounted therein to permit of vertical movement of the same and to prevent their dislodgment therefrom. The bearing blocks 36 are provided with openings for the reception of trunnions 37 of a drum 38, arranged transversely of the machine and in advance of the front shield 18, the lower edge of which is braced and strengthened by braces 39, located at the outer edges of the same and suitably connected at their ends to the aforesaid brackets 35 and to the said shield respectively.

The drum 38 is provided with a plurality of spaced, radially disposed arms 40, formed of spring metal and adapted to flex or bend, when the revolving drum brings the arms into contact with the loose soil, throwing the latter rearwardly. Beneath the lower edge of the front shield and into contact with the rear shield and the trailing plate thereof, the loose soil, while in transit, being subjected to the intense heat of the penetrating flames of the burners causing the destruction of all insect life therein.

In order to cause the drum to constantly rotate while the machine is in motion over the ground, a series of radially disposed bars or spikes 41 of greater length than the spring arms 40, are carried at each end of the drum, said bars having their free ends pointed to facilitate their entrance into the ground to rotate the drum as the machine advances.

The extent of such entrance into the ground of the actuating spikes, and the extent of penetration of the throwing arms, depends upon the nature and condition of the soil which has been previously plowed, and cultivated or harrowed prior to the planting of the crops, and such treatment of the soil brings the cut worms, boll weevil and other insect pests, which lie in wait for the growing plants to the soft, loosened soil on the surface, thus rendering the complete destruction of the same by the heat process a comparatively easy matter.

To obtain the proper adjustment of the drum together with the several arms and spikes carried thereby, a transverse shaft 42 is provided upon the upper faces of the frame sills and adapted to rock in suitable bearings thereon. This shaft is provided with an operating lever 43 having a pawl and ratchet device for coaction with the arcuate rack 44. The shaft carries at its ends crank arms 45, to which are connected the upper ends of vertically disposed links 46, the lower ends of the latter being pivotally connected to the slidable bearing blocks 36 having the trunnions of the drum 38 mounted therein. By simply rocking the shaft 42 in the proper direction, the drum is elevated or lowered the desired extent to cause the spring arms 40 to bend backwardly, as shown in Figure 1 of the drawing, the ends of the arms which are not pointed, refusing to penetrate, as do the end spikes, and as the drum revolves, the arms are freed and regain their normal shape and discharge their load of soil by throwing the same in the manner described. A driver's seat 47 is mounted at the rear end of the frame.

From the foregoing it will be seen that a simple, easily operated and cheaply manufactured machine of this character has been provided, which may be used to effectually destroy weevil or other insects prior to planting the crop or, by the simple substitution of any desired form of spray nozzle, such as shown at 33ª in Figure 9 of the drawings, for the aforesaid burners, and by filling the tank with chemical spray instead of liquid fuel, the device may be used to equal advantage for destroying other insects after the plants have begun to grow.

What is claimed is:—

1. An insect destroyer to be drawn over the ground after it has been plowed and cultivated, comprising a wheeled frame, a fuel tank mounted on the frame, means to maintain pressure in the tank, a transversely disposed series of downwardly-directed burners in connection with the tank, means for independently controlling the burners, heat-confining shields depending from the frame in advance and in rear of the burners and extending transversely of the frame, and ground lifting means mounted transversely in advance of the heat-confining shields and adapted to lift and throw the loosened soil rearwardly in the space between the shields to subject the soil to the action of heat from the burners.

2. An insect destroyer to be drawn over the ground after it has been plowed and cultivated comprising a wheeled frame, a fuel tank mounted on the frame, means to maintain pressure in the tank, a transversely disposed series of downwardly directed burners in connection with the tank, means for independently controlling the burners, heat-confining shields depending from the frame in advance and in rear of the burners and extending transversely of the frame, the front shield terminating above the ground and rigidly supported, the rear shield being hinged to the frame and having a separate edge plate hinged thereto to trail on the ground, means for holding the rear shield in different adjusted positions, and ground lifting means mounted transversely in advance of the heat-confining shields and adapted to lift and throw the loosened soil rearwardly in the space between the shields to subject the soil to the action of heat from the burners.

3. An insect destroyer to be drawn over the ground after it has been plowed and cultivated comprising a wheeled frame, fuel-supply means carried thereby, independently operable burners connected to the fuel supply and arranged transversely of the frame, transverse, rearwardly inclined shields arranged in front and in rear of the burners to confine and direct the heat thereof, the rear shield being longer and adjustable to change the inclination thereof, a transverse rotary drum mounted in advance of the front shield, and arms carried by the drum and adapted to enter the soil and throw the same back against the rear shield to subject the same to the action of the burners while in transit.

4. An insect destroyer to be drawn over the ground after it has been plowed and cultivated comprising a wheeled frame, a transversely disposed series of burners depending from the frame, means for supplying fuel to said burners, a transversely disposed, rearwardly inclined shield rigidly connected to and depending from the frame in advance of the burners and terminating above the ground, a rearwardly inclined shield hinged at its upper edge beneath the frame and extending close to the ground and in rear of the burners, a trailing plate hinged to the lower edge of said shield, a hand operated, transverse shaft mounted on the frame and having depending arms, links connecting said arms to the rear shield to change the angle of inclination thereof, a transverse rotary drum arranged in advance of the front shield, and arms mounted in the drum and adapted to enter the soil and throw the same rearwardly beneath the front shield, past the flames from the burners, and against the rear shield.

5. An insect destroyer to be drawn over the ground after it has been plowed and cultivated comprising a wheeled frame, a transversely disposed series of burners depending from the frame, means for supplying fuel to said burners, a transversely disposed, rearwardly inclined shield rigidly connected to and depending from the frame in advance of the burners and terminating above the ground, a rearwardly inclined shield hinged at its upper edge beneath the frame and extending close to the ground and in rear of the burners, means for changing the angle of inclination of the rear shield, a transverse rotary drum arranged in advance of the front shield, and arms mounted in the drum and adapted to enter the soil and throw the same rearwardly beneath the front shield, past the flames from the burners, and against the rear shield.

6. A machine for destroying insects to be drawn over the ground after it has been plowed and cultivated, comprising a wheeled frame having means for supplying fuel, a transversely disposed series of burners mounted beneath the frame and in connection with the said means, transverse shields arranged in front and in rear of the burners to confine and direct the heat towards the ground, a transverse drum arranged in front of the shield, a series of radial spikes mounted at each end of the drum to enter the ground and cause the drum to rotate, and a plurality of spring arms radially mounted in the drum and adapted to enter and loosen the soil and throw the same rearwardly beneath the flames.

7. In a machine for destroying insects to be drawn over the ground after it has been plowed and cultivated, the combination of a wheeled frame having a tank thereon, a distributor tank controllably connected to the first-mentioned tank, a plurality of independently controlled connections communicating with the distributor tank and provided with down-turned ends adapted to have burners or spray nozzles applied thereto, depending transverse guard plates secured to the frame in advance and in rear respectively of said ends, a vertically adjustable, transverse drum carried by the frame in advance of the guards, flexible arms projecting radially from the drum to engage loose soil and throw the same rearwardly against the rear guard plate as the drum is rotated, and a series of rigid spikes mounted radially at the ends of the drum to enter the ground and rotate said drum, said spikes being longer than the flexible arms.

8. A machine for destroying insects comprising a wheeled frame, transverse depending shields spaced apart, one in advance of the other, the front shield being arranged with its lower edge above the ground while the rear shield is adapted to trail on the ground, means for adjusting the inclination of the rear shield, means for directing into the space between the shields matter inimical to insect life, and ground lifting means arranged in advance of the shield and adapted to lift and throw the soil rearwardly into the space between the shields.

In testimony that I claim the foregoing as my own, I have hereto affixed my signature.

JOHN KASMEIER.